United States Patent
Lee

(10) Patent No.: US 12,525,033 B2
(45) Date of Patent: Jan. 13, 2026

(54) INTERSECTION RECOGNITION AND RESTORATION SYSTEM USING GEOMETRIC MODELING METHOD AND INTERSECTION RECOGNITION AND RESTORATION METHOD USING THE SAME

(71) Applicant: CARVI INC., Seoul (KR)

(72) Inventor: Eunsu Lee, Seoul (KR)

(73) Assignee: CARVI INC., Seoul (KR)

( * ) Notice: Subject to any disclaimer, the term of this patent is extended or adjusted under 35 U.S.C. 154(b) by 466 days.

(21) Appl. No.: 18/058,675

(22) Filed: Nov. 23, 2022

(65) Prior Publication Data

US 2024/0037962 A1 Feb. 1, 2024

(30) Foreign Application Priority Data

Aug. 1, 2022 (KR) .................. 10-2022-0095403

(51) Int. Cl.
 *G06V 20/56* (2022.01)
 *G06T 7/60* (2017.01)
 *G06T 7/73* (2017.01)

(52) U.S. Cl.
 CPC .............. *G06V 20/588* (2022.01); *G06T 7/60* (2013.01); *G06T 7/73* (2017.01); *G06T 2207/10016* (2013.01); *G06T 2207/30256* (2013.01)

(58) Field of Classification Search
 CPC ........... G06V 20/588; G06T 7/60; G06T 7/73; G06T 2207/10016; G06T 2207/30256
 See application file for complete search history.

(56) References Cited

U.S. PATENT DOCUMENTS 10,279,806 B2 * 5/2019 Oh ..................... G08G 1/167
11,254,329 B2 * 2/2022 Hanniel ............. G01C 21/3815
(Continued)

FOREIGN PATENT DOCUMENTS

JP 2003044836 A * 2/2003
JP 2010170488 A * 8/2010
(Continued)

OTHER PUBLICATIONS

Non-Final Office Action for KR10-2022-0095403 by Korean Intellectual Property Office dated Oct. 11, 2022.
U.S. Appl. No. 17/805,124 (Corresponding to KR 10-2022-005776).

*Primary Examiner* — Shefali D Goradia
(74) *Attorney, Agent, or Firm* — BROADVIEW IP LAW, PC

(57) ABSTRACT

Disclosed are an intersection recognition and restoration system using geometric modeling method and intersection recognition and restoration method using the same. The intersection recognition and restoration system using geometric modeling of the present invention for solving the above problems comprises an image capturing unit that sequentially acquires images from a front camera installed in a subject vehicle; an image analysis unit that detects a driving lane from a sequential image of the video file acquired by the image capturing unit, and recognizes and restores an intersection by a geometric modeling; a memory for storing driving lane and intersection data detected by the image analysis unit; and a display unit that expresses the driving lane and intersection data stored in the memory in the form of a top view.

8 Claims, 8 Drawing Sheets

(56) References Cited

U.S. PATENT DOCUMENTS

| | | | | |
|---|---|---|---|---|
| 2016/0055751 | A1* | 2/2016 | Park | G06V 10/44 |
| | | | | 701/301 |
| 2022/0207276 | A1 | 6/2022 | Lee | |
| 2022/0284713 | A1* | 9/2022 | Rishi | G06F 18/22 |

FOREIGN PATENT DOCUMENTS

| | | |
|---|---|---|
| JP | 2015-75891 A | 4/2015 |
| KR | 10-1342124 B1 | 12/2013 |
| KR | 10-2014-0087622 A | 7/2014 |
| KR | 10-1455835 B1 | 11/2014 |
| KR | 10-1473866 B1 | 12/2014 |
| KR | 10-2296520 B1 | 9/2021 |
| KR | 10-2318586 B1 | 10/2021 |
| WO | 2014/027478 A1 | 2/2014 |

* cited by examiner

INTERSECTION RECOGNITION AND RESTORATION SYSTEM USING GEOMETRIC MODELING METHOD AND INTERSECTION RECOGNITION AND RESTORATION METHOD USING THE SAME

CROSS-REFERENCE TO RELATED APPLICATIONS

This application claims priority from Korean Patent Application No. 10-2022-0095403, filed on Aug. 1, 2022, in the Korean Intellectual Property Office, the disclosure of which is incorporated herein by reference in its entirety.

BACKGROUND OF THE INVENTION

Field of the Invention

The present invention relates to an intersection recognition and restoration system using geometric modeling method and intersection recognition and restoration method using the same, and more specifically, an intersection recognition and restoration system using geometric modeling method and intersection recognition and restoration method using the same, among methods of restoring surrounding situations such as the moment of a traffic accident through sequential image (video) analysis and expressing them in a top view.

Background Technology Description of the Related Art

In the case of a traffic accident, it is often very ambiguous to distinguish between the offender and the victim. Therefore, there is an ongoing dispute over who is the offender and who is the victim.

Recently, with the increase in the supply of automobiles and the increase in casualties due to accidents, black boxes that have been used for aviation are also being used in vehicles. A vehicle black box enables the cause of a traffic accident to be clearly determined by analyzing related data such as vehicle speed, direction, and brake operation.

Such a vehicle black box records the situation at the time of the accident with a camera installed on the front or rear of the vehicle, and stores all sounds around it with a microphone.

However, there is a problem in that it is difficult to accurately understand the path between the actual driving vehicle and the front vehicle at a glance. That is, there is a need for a means to accurately determine the cause of the accident by restoring the entire path.

In the Republic of Korea Application No. 10-2022-005776 "Vehicle path restoration system through sequential image analysis and vehicle path restoration method using the same" (corresponding U.S. patent application Ser. No. 17/805,124), the present applicant discloses an invention that can be expressed as a top view by restoring surrounding situations such as the moment of a traffic accident through sequential image analysis.

In addition to the prior art described above, there is a need for a system and method for recognizing an intersection lane existing on the side of a driving lane, storing it as path data, and expressing it in the form of a top view.

Cited Reference

Patent Document (Patent Document 1) Korean Patent No. 10-1342124 (A Front Vehicle Detecting And Tracking System Using The Image And Detecting And Tracking Method Using The Same, Dec. 19, 2013)

(Patent Document 2) Korean Patent No. 10-1455835 (Lane Recognition and Tracking System Using Images, And Method For Recognition And Tracking Lane Using The Same, Nov. 4, 2014)

(Patent Document 3) Korean Patent No. 10-1473866 (IMAGE PROCESSING SYSTEM FOR VEHICLE AND IMAGE PROCESSING METHOD OF USING THE SAME, Dec. 17, 2014)

(Patent Document 4) Korean Patent No. 10-2296520 (METHOD OF DETECTING CURVED LANE THROUGH PATH ESTIMATION BY MONOCULAR VISION BASED CAMERA, Sep. 1, 2021)

(Patent Document 5) Korean Patent No. 10-2318586 (METHOD OF DETECTING MEDIAN STRIP AND PREDICTING COLLISION RISK THROUGH ANALYSIS OF IMAGES, Oct. 28, 2021)

SUMMARY OF THE INVENTION

The present invention was devised in view of the above-described problems, and its purpose is to recognize an intersection lane existing on the side of a driving lane by a geometric modeling method, store it as path data, and express it in the form of a top view. An object of the present invention is to provide a system for recognizing and restoring an intersection by a geometric modeling method and a method for recognizing and restoring an intersection using the same.

The intersection recognition and restoration system using geometric modeling of the present invention for solving the above problems comprises an image capturing unit that sequentially acquires images from a front camera installed in a subject vehicle; an image analysis unit that detects a driving lane from a sequential image of the video file acquired by the image capturing unit, and recognizes and restores an intersection by a geometric modeling; a memory for storing driving lane and intersection data detected by the image analysis unit; and a display unit that expresses the driving lane and intersection data stored in the memory in the form of a top view. The intersection exists at a lateral position of the driving lane curve C, and the intersection has a geometric structure consisting of a lower end point $P_1$, an upper end point $P_2$, and an angle $\theta_2$ of upper end point $P_2$. The recognizing the intersection is to find the lower end point $P_1$ of the intersection using the lower lane, to find the upper end point $P_2$ using the lower lane and the upper lane, and then to find the angle $\theta_2$ of the upper end point $P_2$ using i) the equation of a straight line passing through the coordinates of the upper end point $P_2$ and the lower end point $P_1$ and ii) the equation of a straight line passing through the tangent of the upper lane obtained in the upper lane detection.

Preferably, detecting the lower lane includes: a curved lane candidate is determined using a variable top-hat filter in which the size of the filter window is flexibly changed on a lateral width of lane markings painted on the road from the sequential image, a skeleton line having a thickness of one pixel is detected using the median value of the lane candidates, and the lower lane of a straight line or parabolic function fitted for the left and right lanes is obtained by using the least squares method by inputting the coordinates of the skeleton line.

Preferably, detecting the upper lane includes: generating a set of coordinates of the upper lane of the intersection using a Sobel edge operator, and using the set of coordinates of the upper lane of the intersection as an input, the upper lane of the parabolic function fitted for the lane is obtained by the least-squares method.

The intersection recognition and restoration method using geometric modeling of the present invention for solving the above problems comprises acquiring sequential images from a front camera of an image capturing unit installed in a subject vehicle; and recognizing and restoring the intersection by receiving the sequential image and performing image analysis in an image analysis unit. The intersection exists at a lateral position of the driving lane curve C, and the intersection has a geometric structure consisting of a lower end point $P_1$, an upper end point $P_2$, and an angle $\theta_2$ of upper end point $P_2$. Recognizing and restoring the intersection includes: detecting a lower lane of the intersection; checking whether the lower lane of the intersection exists in the lower part of the image; detecting an upper lane of the intersection existing on the side of the driving lane when the lower lane of the intersection exists; recognizing the existence of an intersection consisting of a lower end point $P_1$, an upper end point $P_2$, and an angle $\theta_2$ of the upper end point from the lower lane and the upper lane; determining whether the intersection exists; and storing information on the intersection and expressing the intersection on a top view when the intersection exists.

Preferably, detecting the lower lane of the intersection includes: determining a curved lane candidate using a variable top-hat filter in which a size of a filter window is flexibly changed based on a lateral width of a lane marking painted on a road from a front image; detecting a skeleton line having a thickness of one pixel by using a median value of the lane candidates; and obtaining a straight line or parabolic function fitted for the left and right lanes using the least-squares method by inputting the coordinates of the skeleton line.

Preferably, detecting the upper lane of the intersection includes: generating a set of coordinates of the upper lane of the intersection using a Sobel edge operator; and obtaining a parabola function fitted for the lane by the least-squares method by inputting the set of coordinates of the upper lane of the intersection.

Preferably, recognizing the existence of an intersection includes: finding a lower end point $P_1$ of an intersection using the lower lane information; finding an upper end point $P_2$ using information on the lower lane and the upper lane; and obtaining the angle $\theta_2$ of the upper end point $P_2$, the angle $\theta_2$ of the upper end point $P_2$ is calculated using i) the equation of a straight line passing through the coordinates of the upper end point $P_2$ and the lower end point $P_1$ and ii) the equation of a straight line passing through the tangent of the upper lane obtained in the upper lane detection.

Preferably, in the step of determining whether the intersection exists, it is determined that an intersection exists when the following three criteria are satisfied. (1) whether the lower end point $P_1$ exists. (2) the upper lane exists, and whether there is a tangent to the upper lane. (3) whether the value of angle $\theta_2$ of the upper point $P_2$ satisfies a specific range.

The intersection recognition and restoration method using geometric modeling of the present invention for solving the above problems comprises acquiring sequential images from a front camera of an image capturing unit installed in a subject vehicle; and recognizing and restoring the intersection by receiving the sequential image and performing image analysis in an image analysis unit. The intersection exists at a lateral position of the driving lane curve C, and the intersection has a geometric structure consisting of a lower end point $P_1$, an upper end point $P_2$, an angle $\theta_2$ of upper end point $P_2$, an upper close-up point $P_5$ which is the point on the curve C closest to the upper point $P_2$, and a lower close-up point $P_3$ which is the point on the curve C closest to the lower end point $P_1$. Recognizing and restoring the intersection when the lower lane of the intersection disappears from the sequential image includes: checking whether the intersection information exists in the path of the previous time; and estimating the location of the intersection when the intersection information exists in the path of the previous time. $C_1$ means the lane curve of the current time, $C_2$ means the lane curve of the previous time. When the velocity $\vec{v}$ of the subject vehicle at the current time is 0, the coordinate $N_3^2$ on the curve $C_1$ closest to the lower close-up point $P_3^2$ of the previous time is estimated as the lower close-up point of the current time. When the velocity $\vec{v}$ has a value greater than 0, $P_3^1$ is estimated as the lower close-up point of the current time, which has moved from $N_3^2$ to a scalar of $\vec{v}$. Thus, the coordinates of $N_3^2$ are first found, the lower close-up point $P_3$ moved by the current speed is found, and the intersection is restored by estimating the lower point $P_1$ using this.

Preferably, when the lower close-up point $P_3$ is a positive number (lane function region) of the Y-axis of the world coordinate system, the lower end point $P_1$ of the intersection is estimated using an angle $\theta$ of the normal line n passing through the point $P_3^1$ on the lane curve at the current time and the average distance r of $P_1$, $P_3$, and then the intersection is restored.

Preferably, when the lower close-up point $P_3$ is a negative number (lane path area) of the Y-axis of the world coordinate system, the coordinates of the upper end point $P_2$ and the close-up point $P_5$ are obtained using an iterative approximation method, and the intersection is restored.

According to the present invention having the configuration as described above, the geometric structure of the intersection can be recognized through sequential image analysis, and the intersection can be expressed as a top view.

In addition, the location of the intersection can be estimated while maintaining the geometry of the intersection in a spatial-temporal section where the intersection cannot be recognized.

BRIEF DESCRIPTION OF THE DRAWING FIGURES

The above object and advantages of the present invention will become more apparent by describing in detail exemplary embodiments thereof with reference to the attached drawings in which:

FIG. 10 is a view in which FIG. 9 is converted into a world coordinate system according to an embodiment of the present invention.

DETAILED DESCRIPTION OF THE EXEMPLARY EMBODIMENTS

Hereinafter, Intersection recognition and restoration system using geometric modeling method and intersection recognition and restoration method using the same according to a preferred embodiment of the present invention will be described in detail with reference to the accompanying drawings.

The present invention is a method of recognizing an intersection and restoring a path in a section in which an intersection exists through sequential images captured while driving by a subject vehicle in which a camera is installed.

The present invention recognizes an intersection by using the geometry of the intersection, and expresses the intersection in a top view. This geometric structure is determined in the spatial-temporal section where the intersection can be recognized. In addition, the location of the intersection can be estimated while maintaining this geometric structure in the space-time section where the intersection cannot be recognized.

Figure 1:
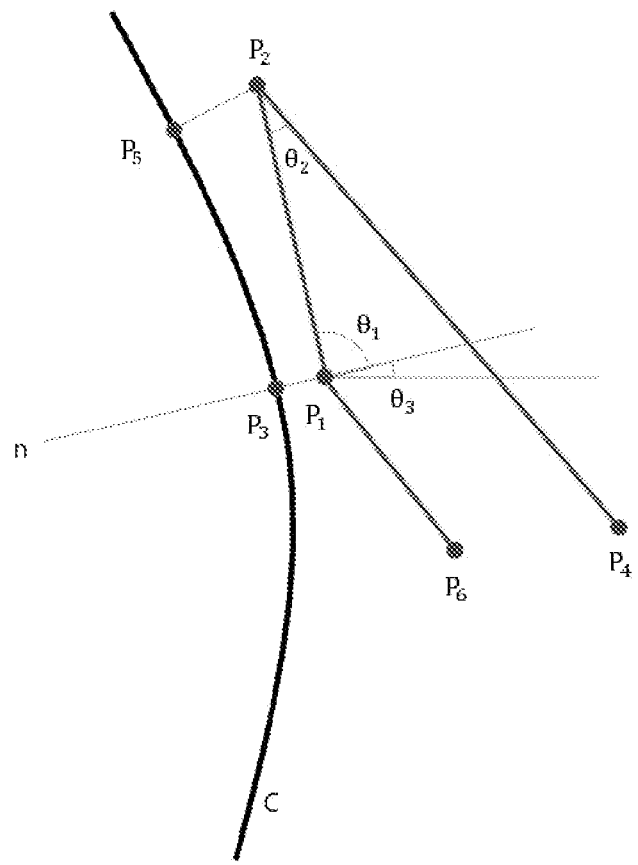
FIG. 1 is the geometry of an intersection according to an embodiment of the present invention.

FIG. 1 is the geometry of an intersection according to an embodiment of the present invention.

Referring to FIG. 1, the intersection exists at a lateral position of the driving lane curve C. In FIG. 1, the intersection has a structure in which four points ($P_6$, $P_1$, $P_2$, $P_4$) are sequentially connected.

Also, the intersection structure is connected to a specific coordinate of the lane curve C, and this point is defined as ($P_3$, $P_5$).

Figure 2:
FIG. 2 is an actual image of an intersection on the right according to an embodiment of the present invention.
Figure 3:
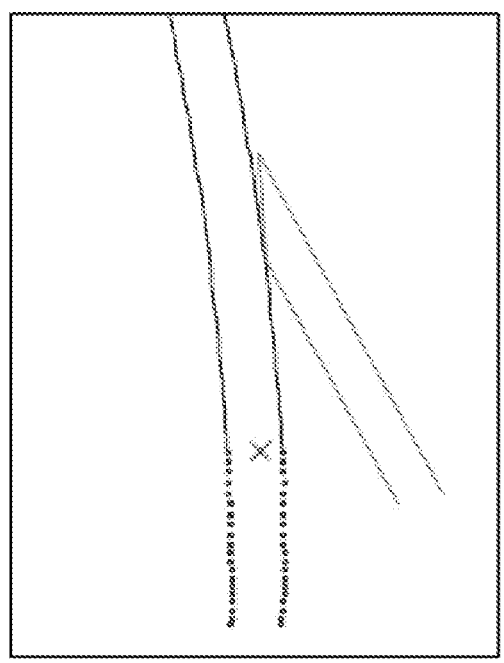
FIG. 3 is a top view of actually reconstructing the image of FIG. 2 according to an embodiment of the present invention.

FIG. 2 is an actual image of an intersection on the right according to an embodiment of the present invention, and FIG. 3 is a top view of the image of FIG. 2 actually restored according to an embodiment of the present invention.

Referring to FIG. 2 and FIG. 3, it can be seen that the shape of the intersection on the side of the right lane of FIG. 3 is generated similarly to the structure of the intersection of FIG. 1.

Hereinafter, factors determining the structure of an intersection in FIG. 1 will be described.

$P_2$ is the upper end point of the intersection, and $P_1$ is the lower end point of the intersection. $\overline{P_1 P_2}$ denotes a line segment connecting the upper and lower points. Curve C denotes a parabola suitable for the lane. $\theta_1$ means the relative angle between the lane and the intersection. The angle $\theta_2$ of the upper end point $P_2$ means the angle of the intersection itself. $\theta_3$ means the angle of the normal n passing through the point $P_3$ on the curve C. The upper close-up point $P_5$ means a point on the curve C that is closest to the upper end point $P_2$. The lower close-up point $P_3$ means a point on the curve C that is the closest to the lower end point $P_1$.

Assuming that the function of the curve C is y=f(x), the general equation of the normal n perpendicular to the tangent to the point $P_3$: ($x_3$, $y_3$) on the curve using the differentiation is the same as in Equation 1.

$$y = -\frac{1}{f'(x_3)}(x - x_3) + f(x_3) \qquad \text{[Equation 1]}$$

If Equation 1 is changed to x=f(y), it is the same as Equation 2.

$$x = -\frac{1}{f'(y_3)}(y - y_3) + f(y_3) \qquad \text{[Equation 2]}$$

Equation 3 shows the equation of the parabola C.

$$f(y) = c + dy + ey^2 \qquad \text{[Equation 3]}$$

Equation 4 shows the differential function of Equation 3. Coefficients c, d, and e mean the result of image recognition, where c, d, and e are parabolic coefficients.

$$f'(y) = d + 2ey \qquad \text{[Equation 4]}$$

When Equations 3 and 4 are input to Equation 2, an equation of a normal line such as Equation 5 can be obtained.

$$x = \left(-\frac{1}{d + 2ey_3}\right) y + \left(\frac{y_3}{d + 2ey_3} + c + dy_3 + ey_3^2\right) \qquad \text{[Equation 5]}$$

In order to obtain the coefficient of the normal in Equation 5, it is necessary to know the coordinates of the point $P_3$, but it is currently unknown.

When the point $P_1$ is known, the method to find the point $P_3$ is as follows. First, we can draw a circle centered on the point $P_1$ and find a circle tangent to the curve. In this case, the radius of the circle has a minimum value. When differentiating this radius, we can find the point $P_3$ in such a way that it is zero.

In FIG. 1, the point $P_1$ is $(x_1, y_1)$. When $\overline{P_1P_3}$ is the radius of the circle, it can be expressed as the equation of the circle as in Equation 6.

$$\overline{P_1P_3}^2 = (f(y)-x_1)^2+(y-y_1)^2 \quad \text{[Equation 6]}$$

Differentiate Equation 6 with respect to y to find the y-coordinate of the minimum point. Let it be $h(y)=\overline{P_1P_3}^2$, and if it is differentiated with respect to y, Equation 7 is obtained.

$$h'(y)=2(f(y)-x_1)f'(y)+2(y-y_1) \quad \text{[Equation 7]}$$

If h(y) becomes minimum at $y=y_3$, $h'(y)=0$ is satisfied. By substituting Equations 3 and 4 into Equation 7, and rearranging for y, Equation 8 is shown below.

$$2e^2y^3+3dey^2+(2ce-2x_1e+d^2+1)y+(cd-x_1d-y_1)=0 \quad \text{[Equation 8]}$$

Equation 8 is a cubic equation for y, and by solving this equation, the y coordinate of the point $P_3$ can be obtained. We use Cardano's method as follows.

When Equation 8 is divided by $2e^2$, which is the $y^3$ coefficient of, Equation 9 is obtained.

$$y^3 + \frac{3de}{2e^2}y^2 + \frac{(2ce-2x_1e+d^2+1)}{2e^2}y + \frac{(cd-x_1d-y_1)}{2e^2} = 0 \quad \text{[Equation 9]}$$

When Equation 9 is simplified to the representative coefficients (A, B, C), Equation 10 is obtained.

$$y^3+Ay^2+By+C=0 \quad \text{[Equation 10]}$$

The solution to Equation 10 is Equation 11.

$$y = \frac{p}{3u} - u - \frac{A}{3} \quad \text{[Equation 11]}$$

Each variable of Equation 11 is obtained as Equation 12.

$$p = B - \frac{A^2}{3} \quad \text{[Equation 12]}$$
$$q = C + \frac{2A^3 - 9AB}{27}$$
$$u = \sqrt[3]{\frac{q}{2} \pm \sqrt{\frac{q^2}{4} + \frac{p^3}{27}}}$$

By inputting Equation 12 into Equation 11, $y_3$ of the lower close-up point $P_3$ can be obtained. By inputting this $y_3$ into Equation 3, $x_3$ can be obtained. So far, a method for obtaining the coordinates of the lower close-up point of FIG. 1 has been described.

Figure 4:
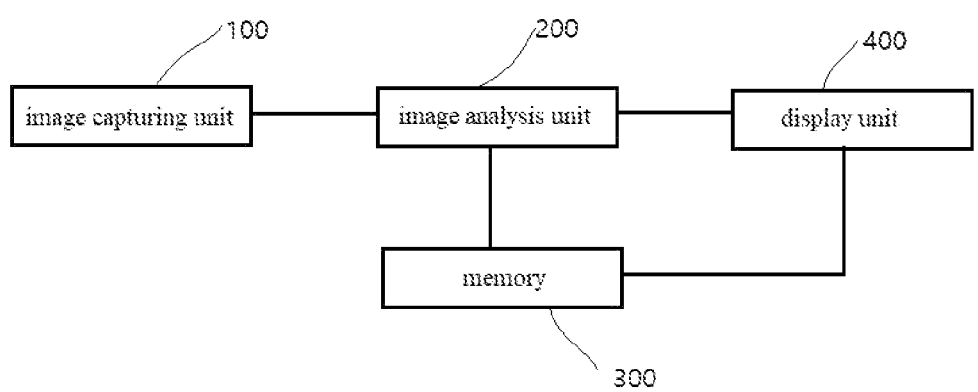
FIG. 4 is a view illustrating a system for recognizing and restoring an intersection according to an embodiment of the present invention.

FIG. 4 is a view illustrating a system for recognizing and restoring an intersection according to an embodiment of the present invention.

Referring to FIG. 4, sequential images are acquired by the image capturing unit 100 having a front camera installed in a subject vehicle.

The image analysis unit 200 analyzes the sequential images of the video file acquired by the image capturing unit 100 to detect a driving lane, and recognizes and restores an intersection by a geometric modeling method.

The driving lane and intersection data detected by the image analysis unit 200 are stored in the memory 300.

The driving lane and intersection data stored in the memory 300 are displayed on the display unit 400 in the form of a top view.

(Method for Recognition and Estimation of Intersection)

This paragraph describes the method of recognizing and estimating an intersection using a flowchart. An intersection can be divided into a section in which the lower lane is visible and a section in which the lower lane is not visible.

Figure 5:
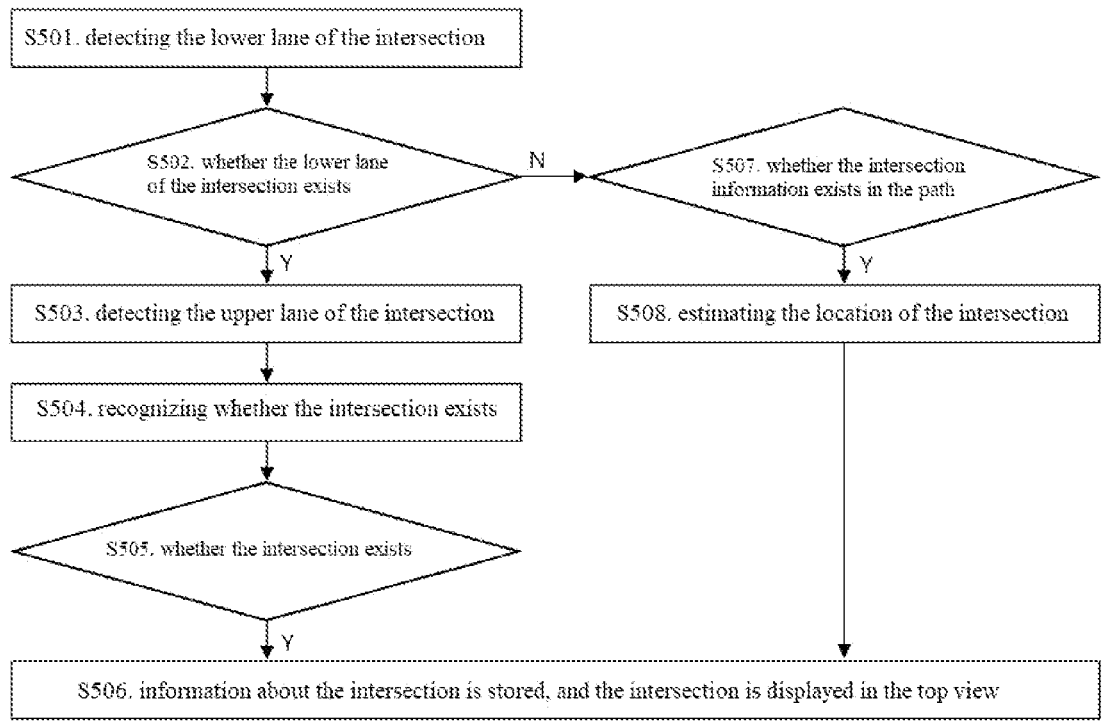
FIG. 5 is a flowchart illustrating a method for recognizing and restoring an intersection according to an embodiment of the present invention.

FIG. 5 is a flowchart illustrating a method for recognizing and restoring an intersection according to an embodiment of the present invention.

Referring to FIG. 5, a flowchart for recognizing and estimating an intersection is shown by dividing a section in which both the upper and lower lanes of the intersection are visible and a section in which the lower lane of the intersection is not visible.

First, sequential images are acquired from the front camera of the image capturing unit installed in the subject vehicle. Next, the image analysis unit receives the sequential image and performs image analysis to recognize and estimate the intersection.

Steps S501 to S505 in FIG. 5 proceed with the process of recognizing the intersection when the shape of the intersection is shown in the image.

Steps S507 to S508 in FIG. 5 proceed with the process of estimating the location of the intersection when the lower lane of the intersection disappears from the image.

Step S506 in FIG. 5 is a step of storing information on the intersection and displaying the information on the top view when an intersection is found.

Specifically, first, the step of detecting the lower lane of the intersection (S501) is an image processing step for determining whether a lower lane of the intersection exists on the side of the lane.

The first process of detecting the lower lane determines a lane candidate. When a lane candidate is determined from the input image of FIG. 2, the lane candidate result of FIG. 6 may be obtained.

Figure 6:
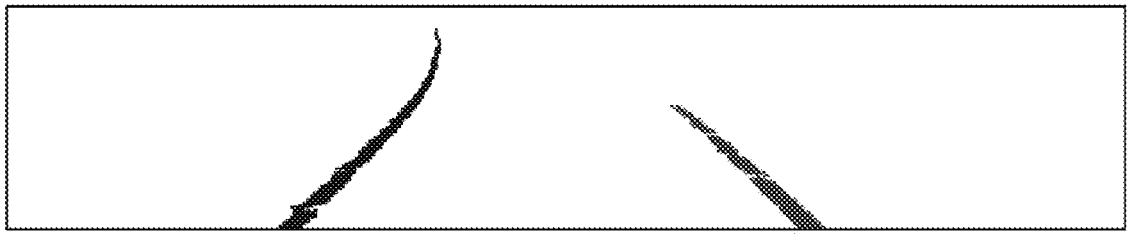
FIG. 6 is a view illustrating a lane candidate in the input image of FIG. 2 according to an embodiment of the present invention.

FIG. 6 is a view illustrating a lane candidate in the input image of FIG. 2 according to an embodiment of the present invention.

Referring to FIG. 6, left dots indicate coordinates of left lane candidates, and right dots indicate coordinates of right lane candidates. The lane candidate detection method uses a variable top-hat filter in which the size of the filter window is flexibly changed based on the lateral width of lane markings painted on the road. The variable top-hat filter is described in detail in Korean Patent Registration No. 10-2296520 "METHOD OF DETECTING CURVED LANE THROUGH PATH ESTIMATION BY MONOCULAR VISION BASED CAMERA" (corresponding U.S. patent application Ser. No. 17/159,150), of the present applicant.

The second process of lower lane detection is the skeleton line detection step. A skeleton line having a thickness of one pixel is detected using the intermediate value of the above-described lane candidates.

Figure 7:
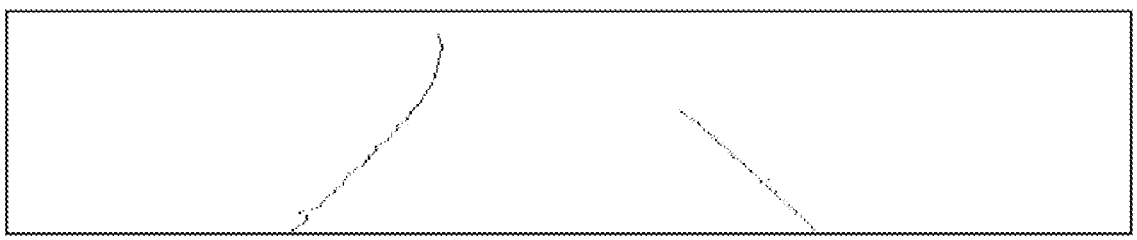
FIG. 7 is a view illustrating detection of a skeleton line in the lane candidate of FIG. 6 according to an embodiment of the present invention.

FIG. 7 is a view illustrating detection of a skeleton line in the lane candidate of FIG. 6 according to an embodiment of the present invention.

Referring to FIG. 7, a skeletal line composed of coordinates of a selected intermediate value is detected by laterally scanning the lane candidates of FIG. 6.

In addition, by inputting the coordinates of the skeleton lines of the left and right lanes, a straight line or parabolic function suitable for the left and right lanes can be obtained using the least squares method. (Refer to Korean Patent Registration No. 10-2296520 "METHOD OF DETECTING CURVED LANE THROUGH PATH ESTIMATION BY MONOCULAR VISION BASED CAMERA" (corresponding U.S. patent application Ser. No. 17/159,150)). At this time, the length and position of the lower lane can be calculated.

Referring to FIG. 1, the lower end point $P_1$ has an integer value determined as the upper point of the skeleton line. Since the parabola C is a curve suitable for the skeleton coordinates by the least-squares method, each point has a real value. Therefore, the lower end point $P_1$ and the lower close-up point $P_3$ may have similar values, but not the same. From a distance, they appear to coincide, but as they get closer, $P_1$ and $P_3$ become farther apart.

Next, in step S502, it is checked whether the lower lane of the intersection obtained in S501 is measured as a length of a specific range and exists at the lower end of the image.

When there is the lower lane of the intersection, it branches to step S503. When the lower lane of the intersection does not exist, it branches to step S507.

Next, step S503 is a process of detecting the upper lane of the intersection existing on the side of the driving lane. In the case of the image of FIG. 2, an intersection exists on the right side of the right lane, and the upper lane exists in a curved shape.

A method for detecting this upper lane (upper curve) is as follows.

First, an edge of the right side is detected using a sobel edge operator. Scan from the center of the lane to the right side, and add the detected edge coordinates to the upper coordinate set. When this process is repeated from the top to the bottom of the Y-axis of the image, a set of coordinates of the upper lane of the intersection is generated.

Figure 8:
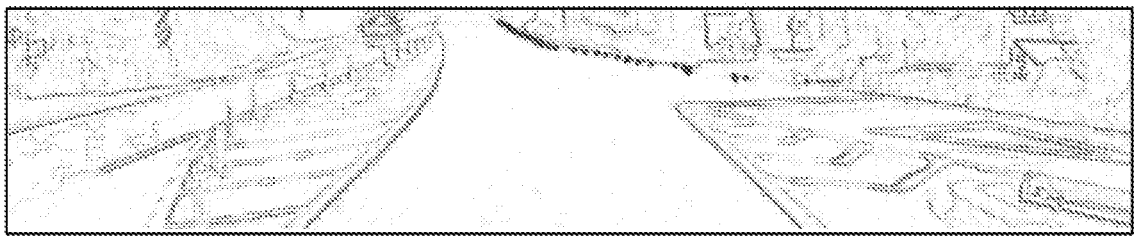
FIG. 8 is a view illustrating a set of coordinates of an upper lane of an intersection according to an embodiment of the present invention.

FIG. 8 is a view illustrating a set of coordinates of an upper lane of an intersection according to an embodiment of the present invention.

Referring to FIG. 8, edges expressed in gray levels can be seen, and upper points mean a set of intersection upper lanes obtained through the above process.

Figure 9:
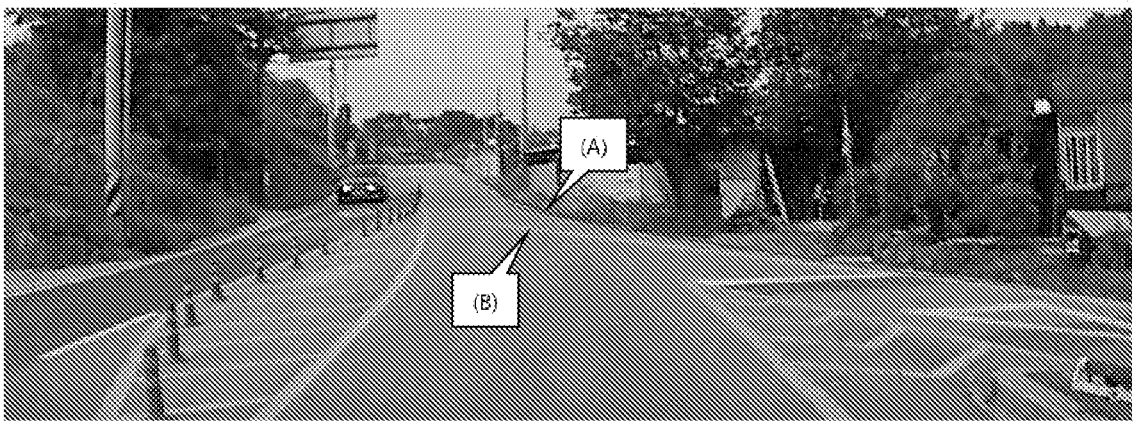
FIG. 9 is a view showing a result of finding an intersection upper lane with a curve using the intersection upper lane set according to an embodiment of the present invention.

FIG. 9 is a view showing a result of finding an intersection upper lane with a curve using the intersection upper lane set according to an embodiment of the present invention.

Referring to FIG. 9, a curve (parabola) may be fitted by the least squares method by inputting the intersection upper lane set. Curve (A) shows the result of finding the upper lane of the intersection as a curve using the intersection upper lane set of FIG. 8. When the forward distance of this curve is 0, we can find the tangent line. This tangent line is later used to find the upper segment of the intersection ($\overline{P_2 P_4}$ in FIG. 1). In FIG. 9, the tangent line of the curve (A) is indicated by a straight line (B).

Figure 10:
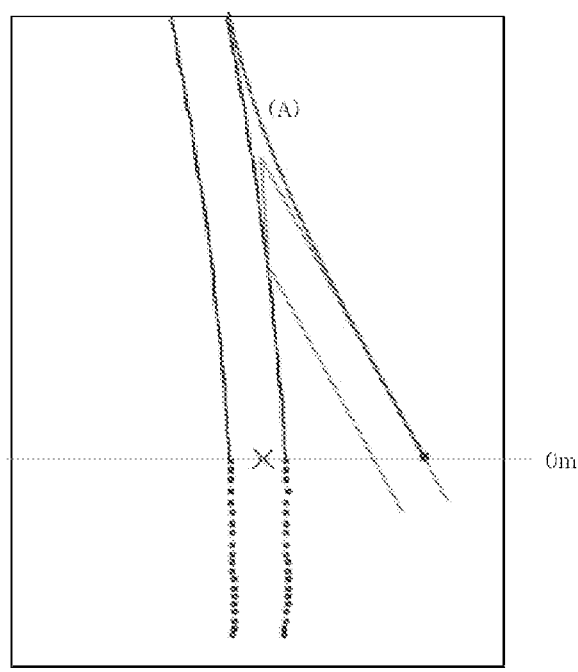

FIG. 10 is a view in which FIG. 9 is converted into a world coordinate system according to an embodiment of the present invention.

Referring to FIG. 10, the curve (A) of FIG. 9 corresponds to the curve (A) of FIG. 10. A point at which the front distance of this curve is 0 means a point on the horizontal line of FIG. 10. The coordinates when the front distance of the curve is 0 is where the curve (A) and the horizontal line meet. In FIG. 10, this coordinate is indicated by dot.

Next, S504 is a step of recognizing whether the intersection exists using the features obtained above.

Figure 11:
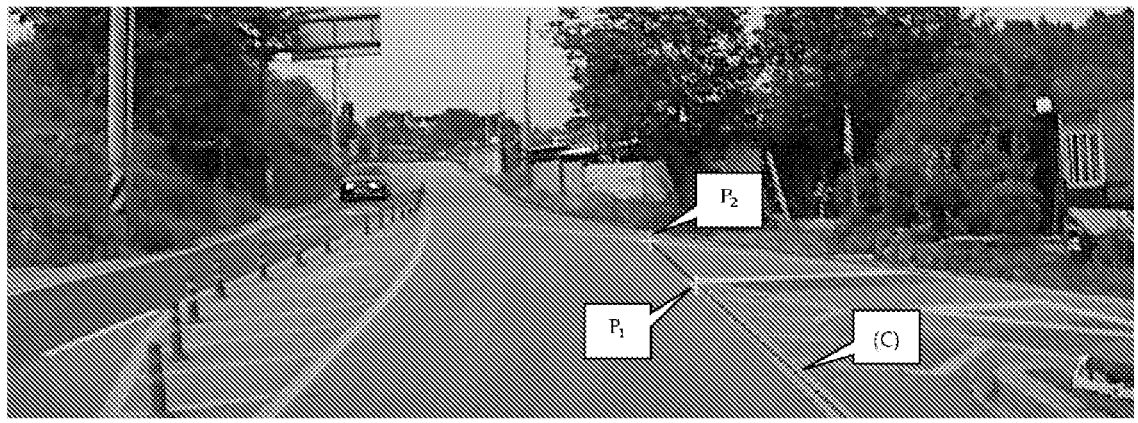
FIG. 11 is a view for explaining the recognition of the existence of an intersection according to an embodiment of the present invention.

FIG. 11 is a view for explaining the recognition of the existence of an intersection according to an embodiment of the present invention.

Referring to FIG. 11, the first step is to find the lower end point $P_1$ of FIG. 1 by using the lower lane information obtained in step S501. In order to find the lower end point $P_1$, a straight line that fits the skeleton line of the lower lane is found. In FIG. 11, (C) shows a straight line fitted for the skeleton line of the lower lane. The coordinates of the lower end point $P_1$ can be obtained by finding the coordinates on the straight line (C) having the uppermost Y coordinate value of the skeleton line of the lower lane. By way of example, $P_1$ is indicated by a cross in FIG. 11.

The second step is to find the upper end point $P_2$ of FIG. 1. A point where the tangent line (B) of FIG. 9 and the lower lane straight line (C) of FIG. 11 meet is obtained and set as the upper end point $P_2$. By way of example, $P_2$ is indicated by a cross in FIG. 11.

Third, the angle $\theta_2$ of the upper end point $P_2$ in FIG. 1 is obtained. This angle $\theta_2$ can be obtained as the difference between the angles of the line segments $\overline{P_1 P_2}$ and $\overline{P_2 P_4}$ in FIG. 1. Since the coordinates of the upper end point $P_2$ and the lower end point $P_1$ were obtained in the previous step, the equation of the straight line passing through $\overline{P_1 P_2}$ can be obtained. In addition, the equation of the straight line passing through $\overline{P_2 P_4}$ was obtained in the upper lane detection step S503.

In step S505, it is determined whether the intersection exists by using the information obtained in step S504. There are three judgment conditions as follows.

(1) Does the lower end point $P_1$ exist?
(2) Does the upper lane exist and is there a $\overline{P_2 P_4}$ tangent to the upper lane?
(3) Does the value of angle $\theta_2$ of the upper end point $P_2$ satisfy a specific range?

The conditional expression of (3) above is the same as Equation 13.

$$t < \theta_2 < (180 - t) \qquad \text{[Equation 13]}$$

For example, if t is 10 in Equation 13, the angle of the upper end point ranges from 10 degrees to 170 degrees. That is, if the angle of $\theta_2$ is between 10 and 170 degrees, it means that it is recognized as an intersection.

Next, in step S506, if the above three conditions are satisfied, it is determined that the intersection exists, information about the intersection is stored, and the intersection is displayed in the top view.

Figure 12:
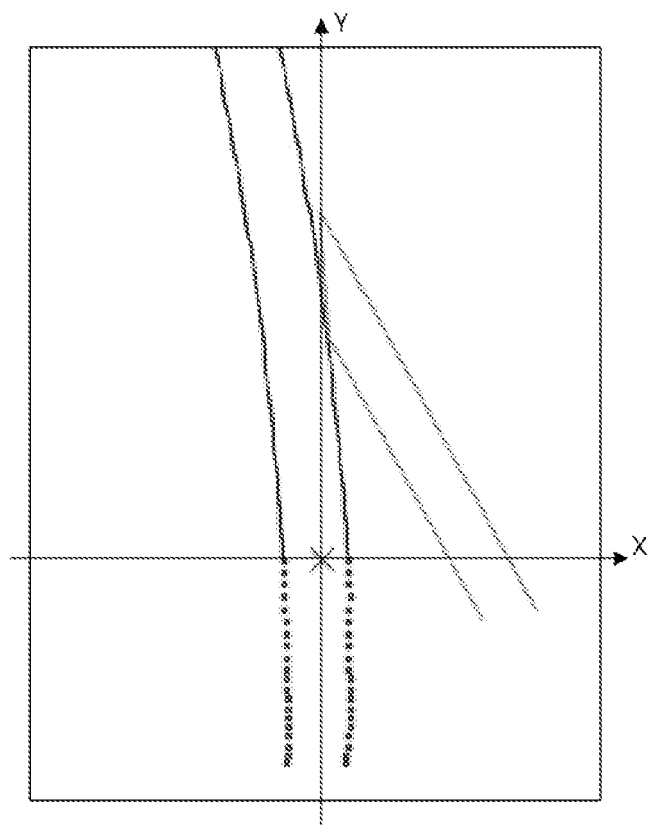
FIG. 12 is a top view showing an intersection according to an embodiment of the present invention.

FIG. 12 is a top view showing an intersection according to an embodiment of the present invention. FIG. 12 shows which coordinate system the top view uses. The top view is based on the XY coordinate system when the height is 0 in the world coordinate system. The X mark indicates the position of the target vehicle's camera, and is the origin of the world coordinate system. The X-axis means a lateral direction with respect to the subject vehicle, and the Y-axis means a front-rear direction with respect to the subject vehicle. A positive area on the Y-axis means that the lane shown in the current image is expressed as a straight line or curve function. Coordinates in the negative region of the Y-axis mean lane path data stored in the past time.

Referring to FIG. 12, it can be seen that lanes and intersections detected in the current image are displayed in a positive area of the Y-axis, and path coordinates of the lane are displayed in a negative area of the Y-axis by dots.

Hereinafter, a method of restoring the structure of the intersection and estimating the position of the intersection when the subject vehicle passes the intersection and the lower lane of the intersection is not visible will be described.

In steps S507 and S508 of FIG. 5, when the lower lane of the intersection is not visible, the structure of the intersection is restored and the location is estimated.

S507 is a step of checking whether the intersection information exists in the path. In other words, it is a step to check whether an intersection existed in the past time. It is possible to branch to the next step only when there is an intersection in the path.

The step S508 of estimating the location of the intersection is when the intersection exists at a previous time, but the lower lane of the intersection is not visible in the current image. In this step, the process of estimating the location of the intersection is performed.

In detail, the step of estimating the location of the intersection is divided into two types.

First, the estimation method is different depending on where the lower proximal point $P_3$ of FIG. 1 exists on the Y-axis of the world coordinate system. If the lower close-up point $P_3$ is positive on the Y-axis, it exists on the current lane. On the other hand, if the lower close-up point $P_3$ is negative on the Y-axis, it exists on the path. As can be seen from FIG. 1, since the intersection structure is connected by a geometric distance and an angle next to the lane, it is affected by the shape of the lane or path. For better understanding, in FIG. 12, a positive region on the Y-axis is referred to as a "lane function region" and a negative region on the Y-axis is defined as a "lane path region".

The following describes a method for estimating the location of an intersection where the lower point of the intersection is not visible. A method of finding the coordinates will be described assuming that the lower close-up point $P_3$ in FIG. 1 is a positive number on the Y-axis.

According to the definition of the intersection in FIG. 1, the lower close-up point $P_3$ is on the curve c.

Figure 13:
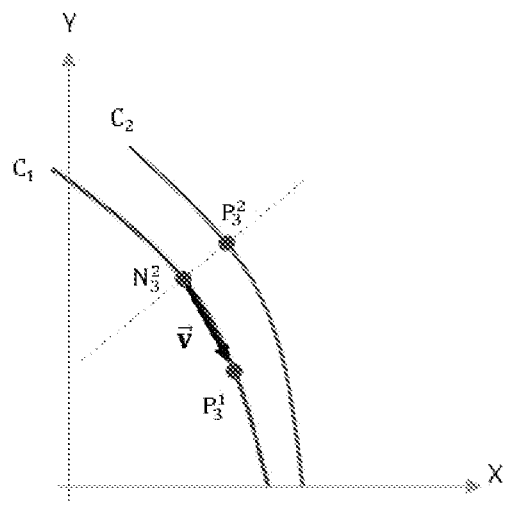
FIG. 13 is a view illustrating a change in the position of the lower close-up point over time according to an embodiment of the present invention.

FIG. 13 is a view illustrating a change in the position of the lower close-up point over time according to an embodiment of the present invention.

Referring to FIG. 13, $C_1$ denotes the lane curve of the current time, and $C_2$ denotes the lane curve of the previous time. If the speed $\vec{v}$ of the subject vehicle at the current time is 0, the coordinate $N_3^2$ on the curve $C_1$ closest to the lower close-up point $P_3$ of the previous time can be estimated as the lower close-up point of the current time. If the velocity $\vec{v}$ has a value greater than 0, it can be estimated that $P_3^1$, which has moved from the starting point $N_3^2$ to the scalar of $\vec{v}$, is the lower close-up point of the current time. Therefore, the inventor of the present application proposes a method of finding the coordinates of $N_3^2$ first and finding $P_3^1$ moved by the current speed.

Since the coordinates of $N_3^2$ in FIG. 13 are coordinates on the curve $C_1$ closest to the point $P_3^2$, the method for obtaining the point $P_3$ in FIG. 1 can be applied in the same way.

And, by applying a method using an inscribed circle in Korean Patent Registration No. 10-2296520 "METHOD OF DETECTING CURVED LANE THROUGH PATH ESTIMATION BY MONOCULAR VISION BASED CAMERA" (corresponding U.S. patent application Ser. No. 17/159,150)', the lower close-up point of the current time is obtained.

The equation of the inscribed circle of the curve $C_1$ passing through the close-up point $N_3^2$ can be expressed as Equation 14.

$$(X_c-x_3)^2+(Y_c-y_3)^2=r^2 \qquad \text{[Equation 14]}$$

The point of intersection of the curve and the inscribed circle is $N_3^2$, the coordinate is $(x_3, y_3)$, and the value is calculated. The radius r of the inscribed circle of the curve having $N_3^2$ as the point of contact can be summarized as in Equation 15 by using an equation to find the curvature.

$$r(y) = \frac{\{1+(d+2ey)^2\}^{\frac{3}{2}}}{|2e|} \qquad \text{[Equation 15]}$$

In Equation 15, d and e mean coefficients of the curve of Equation 3. Here, y is input $y_3$.

In Equation 14, $(X_c, Y_c)$ is the center coordinate of the inscribed circle, and a method for obtaining this will be described below.

The equation of the normal passing through the center of the inscribed circle and passing through the contact point $N_3^2$ of the curve is the same as Equation 5. In Equation 5, values of all coefficients except for x and y are constants, so it is simplified and summarized as follows.

$$X_c=KY_c+L \qquad \text{[Equation 16]}$$

Here, $$K = \left(-\frac{1}{d+2ey_3}\right) \text{ and } L = \left(\frac{y_3}{d+2ey_3}+c+dy_3+ey_3^2\right).$$

Substituting Equation 16 into Equation 14, Equation 17 is obtained.

$$(KY_c+L-x_3)^2+(Y_c-y_3)^2=r^2 \qquad \text{[Equation 17]}$$

If Equation 17 is arranged as a quadratic equation for $Y_c$ the following Equation 18 is obtained.

$$(K^2+1)Y_c^2(K(L-x_3)-y_3)Y_c+(L-x_3)^2+y_3^2-r^2=0 \qquad \text{[Equation 18]}$$

When the root of the quadratic equation is obtained for Equation 18, the $Y_c$ value can be obtained. By substituting $Y_c$ into Equation 16, $X_c$ can be obtained. So far, the center coordinate $(X_c, Y_c)$ of the inscribed circle has been obtained.

The inscribed circle obtained above passes through the proximal point $N_3^2$ of the curve $C_1$ of FIG. 13. In the inscribed circle, the coordinates located at the distance moved for 1 frame in $N_3^2$ can be found, and this coordinate can be said to be an approximation of $P_3^1$ of the curve $C_1$. The method of finding this coordinate uses the parameter Equation 19.

$$X=X_c+r\cos\theta \qquad \text{[Equation 19]}$$

$$Y=Y_c+r\sin\theta$$

Since this equation defines the coordinates of the circle by the angle, the angles of the adjacent points $N_3^2$ and $P_3^1$ are obtained. Since the coordinates of the close-up point $N_3^2$ are calculated above, the angle can be obtained using Equation 20.

$$\theta = \cos^{-1}\left(\frac{X-X_c}{r}\right) \qquad \text{[Equation 20]}$$

$$\theta = \sin^{-1}\left(\frac{Y-Y_c}{r}\right)$$

In this case, the angle of the obtained close-up point $N_3^2$ is defined as θ. By using the current speed of the subject vehicle, the distance moved in one frame can be obtained, and when this value is input in Equation 21, the angle 1 moved during one frame can be obtained.

$$\Delta\theta = \frac{180 \times L_c}{\pi r}$$ [Equation 21]

In Equation 21, $L_c$ denotes a distance traveled by the target vehicle during one frame. Angle $\theta_2$ of $P_3^1$ can be defined in Equation 22 below.

$$\theta_2=\theta+\Delta\theta$$ [Equation 22]

When $\theta_2$ of Equation 22 is input into Equation 19, the coordinates of $P_3^1$ can be obtained.

(Restoration of Intersection when Lower Close-Up Point $P_3$ is Positive on Y-Axis)

When the lower close-up point $P_3^1$ obtained above is positive, the method of obtaining the lower end point $P_1$ of the intersection is as follows.

Figure 14:
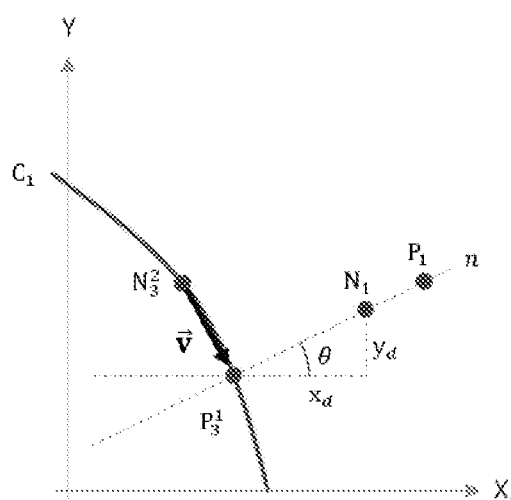
FIG. 14 is a view illustrating a method of estimating the lower end point $P_1$ of an intersection when the lower close-up point $P_3$ is positive on the Y-axis according to an embodiment of the present invention.

FIG. 14 is a view illustrating a method of estimating the lower end point $P_1$ of an intersection when the lower close-up point $P_3$ is positive on the Y-axis according to an embodiment of the present invention.

Referring to FIG. 14, an angle $\theta$ of a normal line n passing through a point $P_3^1$ on the curve may be obtained. When the coordinate of $P_3^1$ is ($x_3$, $y_3$) and the coordinate of any point $N_1$ on the normal is ($x_1$, $y_1$), the equation of the normal is as follows.

$$x=by+a$$ [Equation 23]

Coefficients (a, b) in Equation 23 are the same as K and L in Equation 16. In FIG. 14, when $y_1$ of $N_1$ is 1, it is $x_1=b+a$.

The angle $\theta$ of the normal line n can be defined as follows by the law of trigonometric functions.

$$\theta = \tan^{-1}\left(\frac{y_d}{x_d}\right)$$ [Equation 24]

In Equation 24, $x_d$, $y_d$ can be expressed as Equation 25.

$$x_d=(x_1-x_3)=(b+a-x_3)$$ [Equation 25]

$$y_d=(y_1-y_3)=(1-y_3)$$

By substituting Equation 25 into Equation 24 to solve, angle $\theta$ of the normal line n can be obtained. When the angle $\theta$ and the average distance r of $P_1$, $P_3$ are input into Equation 19, the coordinates of the lower end point $P_1$ of the intersection can be obtained.

(Restoration of Intersection when Lower Close-Up Point $P_3$ is Negative on Y-Axis)

This paragraph describes how to restore the intersection when the lower close-up point $P_3$ is negative on the Y-axis of the world coordinate system.

When the lower close-up point $P_3$ enters the negative region of the Y-axis (lane path region) of the world coordinate system, a different situation occurs than when it exists in the positive region of the Y-axis of the world coordinate system (the lane-function region). In the lane path area, unlike the lane function area, the lane is not expressed as a single curve function. When the lower close-up point $P_3$ enters the lane path area, the lower close-up point $P_3$ is connected to the uppermost path coordinates. In other words, the lower close-up point $P_3$ is one of the path coordinates, not the measured value.

In the present invention, the restoration of the intersection in the lane path area uses data calculated from the previous frame. In detail, average values obtained when an intersection exists in the lane function region with respect to $\overline{P_1P_3}$, $\overline{P_1P_2}$, $\overline{P_2P_5}$, and $\theta_2$ in FIG. 1 are used. The coordinates of the lower end point $P_1$ can be obtained using the method used in the previous paragraph, "Restoration of intersection when lower close-up point $P_3$ is negative on Y-axis". When the intersection exists in the lane function region, the position of $P_2$ can be obtained using $\theta_1$ in FIG. 1. However, when the intersection exists in the lane path area, $\theta_1$ in FIG. 1 cannot be used. This is because points $P_3$ and $P_5$ do not exist on the same curve C as in FIG. 15.

Figure 15:
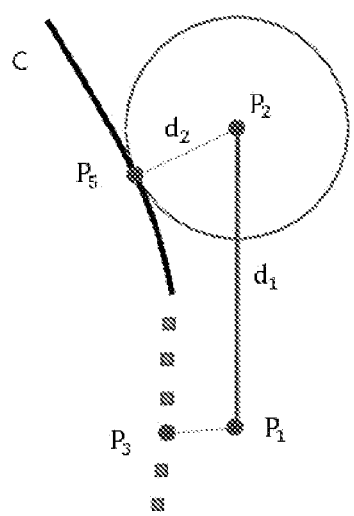
FIG. 15 is a view for explaining restoration of an intersection when the lower close-up point $P_3$ exists in a lane path region according to an embodiment of the present invention.

FIG. 15 is a view for explaining restoration of an intersection when the lower close-up point $P_3$ exists in a lane path region according to an embodiment of the present invention.

Referring to FIG. 15, the rectangles at the lower part represent the path coordinates of the lane, and C means that the lane recognized on the current frame is fit as a curve. It can be seen that the lower close-up point $P_3$ of the intersection is on the lane path, and the upper close-up point $P_5$ is on the lane curve function C.

Hereinafter, a method for obtaining the coordinates of $P_2$ and $P_5$ in the case of FIG. will be described.

Since it is difficult to directly solve the coordinates of $P_2$ and $P_5$ into equations, the method of finding approximate values by an iterative method is used. Currently, available input data is the coordinate ($x_1$, $y_1$) of $P_1$, the lengths $d_1$ of $P_1$ and $P_2$, and the length $d_2$ of $P_2$ and $P_3$. The coordinates of $P_2$ and $P_3$ are unknown. In FIG. 15, the position of $P_2$: ($x_2$, $y_2$) exists on the circumference with $P_1$ as the center and $d_1$ as the radius, and thus can be defined as in Equation 26.

[Equation 26]

$$x_2=x_1+d_1 \cos\theta$$

$$y_2=y_1+d_1 \sin\theta$$

In Equation 26, if the angle $\theta$ is changed, the coordinates of $P_2$ may be changed. In addition, the method of obtaining the point $P_5$ on the curve closest to the lower end point $P_2$ can be obtained as a solution of the cubic equation in Equation 10.

Now, the distance $d_t$ between $P_2$ and $P_5$ can be found. It is checked whether the distance $d_t$ is similar to the previously obtained average distance $d_2$. If they are not similar, change the angle $\theta$ to find the distance $d_t$ again. If they are similar, it is determined that the coordinates of $P_2$ and $P_5$ have been obtained and the iteration is terminated. Equation 27 refers to a conditional expression for terminating the iteration for obtaining the distance between $P_2$ and $P_5$.

$$|d_2-d_t|<\varepsilon$$ [Equation 27]

Here, $d_2$ means the average distance between $P_2$ and $P_5$ obtained in advance in the lane coordinate region. $d_t$ denotes the distance between $P_2$ and $P_5$ obtained by the above-described iteration. $\varepsilon$ denotes an error tolerance threshold for the difference between $d_2$ and $d_t$.

So far, a method for restoring an intersection when the lower close-up point $P_3$ exists in the lane path region has been described.

Figure 16:
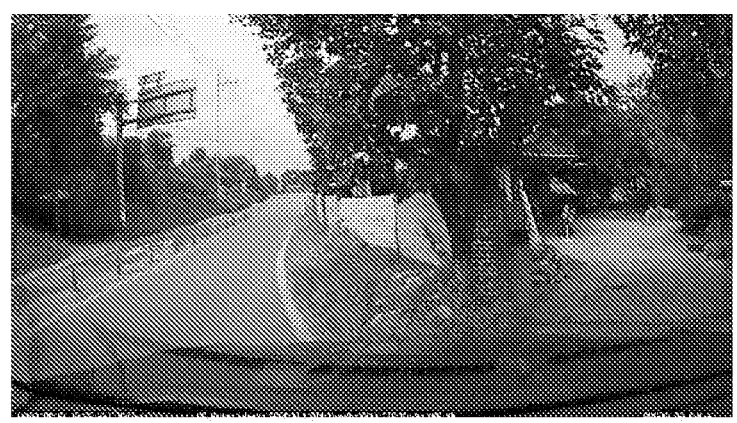
FIG. 16 shows an image when a lower end point of an intersection exists in a lane path area and an upper end point exists in a lane function area according to an embodiment of the present invention.
Figure 17:
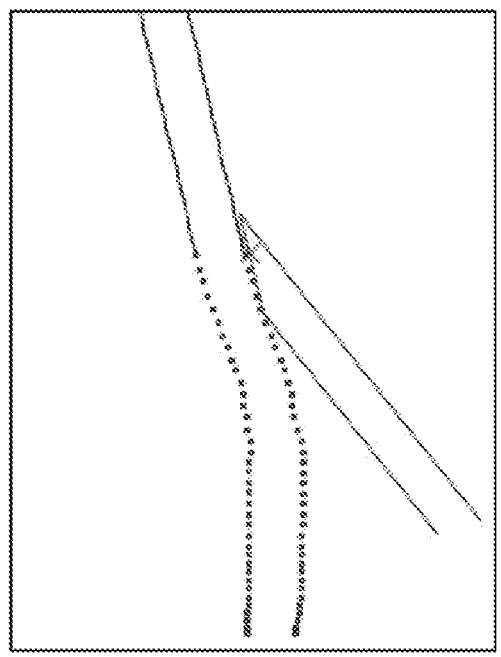
FIG. 17 is a top view of an intersection restored from the image of FIG. 16 according to an embodiment of the present invention.

FIG. 16 shows an image when a lower end point of an intersection exists in a lane path area and an upper end point exists in a lane function area according to an embodiment of the present invention. FIG. 17 is a top view of an intersection restored from the image of FIG. 16 according to an embodiment of the present invention.

Referring to FIGS. 16 and 17, a dotted line indicates a lane path, and a solid line at the top indicates a lane detected on the current frame. The intersection has been restored to the right of the right lane. X indicates the position of the subject vehicle's camera.

While the present invention has been particularly shown and described with reference to preferred embodiments thereof, it will be understood by those of ordinary skill in the art that various changes in form and details may be made therein without departing from the spirit and scope of the present invention as defined by the following claims.

What is claimed is:

1. Intersection recognition and restoration method using geometric modeling, comprising:
    acquiring sequential images from a front camera of an image capturing unit installed in a subject vehicle; and
    recognizing and restoring the intersection by receiving the sequential image and performing image analysis in an image analysis unit,
    the intersection exists at a lateral position of a driving lane curve C, and the intersection has a geometric structure consisting of a lower end point $P_1$, an upper end point $P_2$, and an angle $\theta_2$ of upper end point $P_2$, wherein
    recognizing and restoring the intersection includes:
    detecting a lower lane of the intersection;
    checking whether the lower lane of the intersection exists in a lower part of the sequential image;
    detecting an upper lane of the intersection existing on the side of the driving lane when the lower lane of the intersection exists;
    recognizing an existence of an intersection consisting of a lower end point $P_1$, an upper end point $P_2$, and an angle $\theta_2$ of the upper end point from the lower lane and the upper lane;
    determining whether the intersection exists; and
    storing information on the intersection and expressing the intersection on a top view when the intersection exists.

2. Intersection recognition and restoration method using geometric modeling of claim 1, wherein
    detecting the lower lane of the intersection includes:
    determining a curved lane candidate using a variable top-hat filter in which a size of a filter window is flexibly changed based on a lateral width of a lane marking painted on a road from a front image;
    detecting a skeleton line having a thickness of one pixel by using a median value of the lane candidates; and
    obtaining a straight line or parabolic function fitted for the left and right lanes using the least-squares method by inputting the coordinates of the skeleton line.

3. Intersection recognition and restoration method using geometric modeling of claim 1, wherein
    detecting the upper lane of the intersection includes:
    generating a set of coordinates of the upper lane of the intersection using a Sobel edge operator; and
    obtaining a parabola function fitted for the lane by the least-squares method by inputting the set of coordinates of the upper lane of the intersection.

4. Intersection recognition and restoration method using geometric modeling of claim 1, wherein
    recognizing the existence of an intersection includes:
    finding a lower end point $P_1$ of an intersection using the lower lane information;
    finding an upper end point $P_2$ using information on the lower lane and the upper lane; and
    obtaining the angle $\theta_2$ of the upper end point $P_2$, the angle $\theta_2$ of the upper end point $P_2$ is calculated using i) the equation of a straight line passing through the coordinates of the upper end point $P_2$ and the lower end point $P_1$ and ii) the equation of a straight line passing through the tangent of the upper lane obtained in the upper lane detection.

5. Intersection recognition and restoration method using geometric modeling of claim 4, wherein
    in the step of determining whether the intersection exists, it is determined that an intersection exists when the following three criteria are satisfied:
    whether the lower end point $P_1$ exists;
    the upper lane exists, and whether there is a tangent to the upper lane; and
    whether the value of angle $\theta_2$ of the upper point $P_2$ satisfies a specific range.

6. Intersection recognition and restoration method using geometric modeling, comprising:
    acquiring sequential images from a front camera of an image capturing unit installed in a subject vehicle; and
    recognizing and restoring the intersection by receiving the sequential image and performing image analysis in an image analysis unit,
    the intersection exists at a lateral position of a driving lane curve C, and the intersection has a geometric structure consisting of a lower end point $P_1$, an upper end point $P_2$, an angle $\theta_2$ of upper end point $P_2$, an upper close-up point $P_5$ which is a point on the curve C closest to an upper point $P_2$, and a lower close-up point $P_3$ which is the point on the curve C closest to the lower end point $P_1$, wherein
    recognizing and restoring the intersection when a lower lane of the intersection disappears from the sequential image includes:
    checking whether the intersection information exists in the path of a previous time; and
    estimating the location of the intersection when the intersection information exists in the path of the previous time,
    $C_1$ means the lane curve of the current time, $C_2$ means the lane curve of the previous time,
    when a velocity $\vec{v}$ of the subject vehicle at the current time is 0, the coordinate $N^2_3$ on the curve $C_1$ closest to the lower close-up point $P_3^2$ of the previous time is estimated as the lower close-up point of the current time,
    when the velocity $\vec{v}$ has a value greater than 0, $P_3^1$ is estimated as the lower close-up point of the current time, which has moved from $N_3^2$ to a scalar of $\vec{v}$,
    the coordinates of $N_3^2$ are first found, the lower close-up point $P_3$ moved by the current speed is found, and the intersection is restored by estimating the lower point $P_1$.

7. Intersection recognition and restoration method using geometric modeling of claim 6, wherein
    when the lower close-up point $P_3$ is a positive number of the Y-axis of the world coordinate system,
    the lower end point $P_1$ of the intersection is estimated using an angle $\theta$ of the normal line n passing through the point $P_3^1$ on the lane curve at the current time and the average distance r of $P_1$, $P_3$, and then the intersection is restored.

8. Intersection recognition and restoration method using geometric modeling of claim 6, wherein
    when the lower close-up point $P_3$ is a negative number of the Y-axis of the world coordinate system, the coordinates of the upper end point $P_2$ and the close-up point $P_5$ are obtained using an iterative approximation method, and the intersection is restored.

\* \* \* \* \*